(12) United States Patent
Poorte

(10) Patent No.: US 8,025,706 B2
(45) Date of Patent: Sep. 27, 2011

(54) FLUID SEPARATING VESSEL

(75) Inventor: Edwin Poorte, Nesbru (NO)

(73) Assignee: Shell Oil Company, Houston, TX (US)

( * ) Notice: Subject to any disclaimer, the term of this patent is extended or adjusted under 35 U.S.C. 154(b) by 45 days.

(21) Appl. No.: 12/307,706

(22) PCT Filed: Jul. 2, 2007

(86) PCT No.: PCT/NO2007/000250
§ 371 (c)(1),
(2), (4) Date: Jun. 29, 2009

(87) PCT Pub. No.: WO2008/004884
PCT Pub. Date: Jan. 10, 2008

(65) Prior Publication Data
US 2010/0011961 A1 Jan. 21, 2010

(30) Foreign Application Priority Data
Jul. 7, 2006 (NO) .................................... 20063167

(51) Int. Cl.
*B01D 45/12* (2006.01)
(52) U.S. Cl. ................ 55/346; 55/345; 55/347; 55/348; 55/349; 55/406; 55/409; 55/401; 55/403; 55/457; 55/502; 55/423; 55/DIG. 46
(58) Field of Classification Search ............ 55/346–349, 55/406, 408, 409, 401, 403, 345, 356, 457, 55/502, 423, DIG. 46
See application file for complete search history.

(56) References Cited

U.S. PATENT DOCUMENTS

| | | | | | |
|---|---|---|---|---|---|
| 1,997,125 | A | * | 4/1935 | Soyez et al. ................... | 209/710 |
| 2,360,355 | A | * | 10/1944 | McBride et al. ............... | 209/712 |
| 2,667,944 | A | * | 2/1954 | Crites .............................. | 55/422 |
| 2,765,918 | A | * | 10/1956 | Fontein et al. .............. | 210/512.2 |
| 2,799,355 | A | * | 7/1957 | Easton ............................ | 55/286 |
| 2,887,177 | A | * | 5/1959 | Mund et al. .................... | 55/321 |
| 2,889,008 | A | * | 6/1959 | Copp et al. ..................... | 55/348 |
| 3,000,036 | A | * | 9/1961 | De Benedetti .................. | 15/314 |
| 3,061,994 | A | * | 11/1962 | Mylting ......................... | 55/346 |
| 3,074,218 | A | * | 1/1963 | O'Dell et al. .................. | 55/343 |
| 3,074,219 | A | * | 1/1963 | Phyl et al. ....................... | 55/348 |
| 3,086,343 | A | * | 4/1963 | Stern ............................... | 55/456 |

(Continued)

FOREIGN PATENT DOCUMENTS

WO    WO0161149    8/2001

(Continued)

*Primary Examiner* — Jason M Greene
*Assistant Examiner* — Dung H Bui

(57) ABSTRACT

A fluid separating vessel (1) comprises: a liquid outlet (3) near the bottom of the vessel; a gaseous fluid outlet (4) near the top of the vessel; a plurality of cyclones (5) arranged in an upper region of the vessel in which at least some liquid droplets that may be entrained in the substantially gaseous fluid stream flowing in upward direction from a fluid inlet (2) towards the gaseous fluid outlet (4) are coalesced, separated from the gaseous carrier fluid and induced to drip down towards the liquid outlet (3) via a liquid return conduit (7); and a plurality of rotating liquid coalescing centrifuges (8) that are arranged below the cyclones (5), in which liquid coalescing centrifuges (8) fluid fed to the cyclones (5) is pre-treated such that at least some liquid droplets that may be entrained in the substantially gaseous fluid stream flowing in upward direction from the fluid inlet towards the cyclones are coalesced.

4 Claims, 2 Drawing Sheets

U.S. PATENT DOCUMENTS

| | | | |
|---|---|---|---|
| 3,104,961 A * | 9/1963 | Westlin | 96/307 |
| 3,147,099 A * | 9/1964 | Burdock et al. | 55/344 |
| 3,216,182 A * | 11/1965 | Cochran et al. | 55/336 |
| 3,394,531 A * | 7/1968 | Andersen | 55/300 |
| 3,409,131 A * | 11/1968 | Petersen et al. | 209/143 |
| 3,425,192 A * | 2/1969 | Davis | 55/345 |
| 3,778,980 A * | 12/1973 | Vancini | 96/319 |
| 3,885,935 A * | 5/1975 | Nutter | 55/457 |
| 3,915,679 A * | 10/1975 | Roach et al. | 55/347 |
| 3,946,650 A * | 3/1976 | Culpepper, Jr. | 126/299 D |
| 4,015,960 A * | 4/1977 | Nutter | 55/355 |
| 4,162,906 A * | 7/1979 | Sullivan et al. | 55/346 |
| 4,407,663 A * | 10/1983 | Hawley | 55/347 |
| 4,504,292 A * | 3/1985 | Vohringer | 55/325 |
| 4,537,608 A * | 8/1985 | Koslow | 55/337 |
| 4,629,481 A * | 12/1986 | Echols | 55/348 |
| 4,650,584 A * | 3/1987 | Macierewicz | 210/512.2 |
| 4,746,340 A * | 5/1988 | Durre et al. | 55/347 |
| 4,767,424 A * | 8/1988 | McEwan | 55/329 |
| 5,209,765 A | 5/1993 | Kolpak et al. | 55/168 |
| 5,256,201 A * | 10/1993 | Gelain et al. | 118/326 |
| 6,080,217 A * | 6/2000 | Gobl et al. | 55/283 |
| 6,190,438 B1 * | 2/2001 | Parks | 95/269 |
| 6,364,940 B1 | 4/2002 | Prueter et al. | 95/261 |
| 6,432,173 B1 * | 8/2002 | Johnson et al. | 95/269 |
| 6,468,321 B2 * | 10/2002 | Kinsel | 55/457 |
| 6,884,273 B2 * | 4/2005 | Kopec et al. | 55/346 |
| 7,144,437 B2 * | 12/2006 | Christiansen et al. | 55/343 |
| 7,157,007 B2 * | 1/2007 | Frankiewicz et al. | 210/703 |
| 7,288,138 B2 * | 10/2007 | Showalter et al. | 96/1 |
| 7,381,235 B2 * | 6/2008 | Koene et al. | 55/394 |
| 7,488,361 B2 * | 2/2009 | Larnholm | 55/318 |
| 7,488,373 B2 * | 2/2009 | Haland et al. | 95/268 |
| 7,534,354 B2 * | 5/2009 | Oserod | 210/703 |
| 2005/0011170 A1 * | 1/2005 | Christiansen et al. | 55/345 |
| 2006/0130445 A1 * | 6/2006 | Park et al. | 55/346 |
| 2007/0044437 A1 * | 3/2007 | Larnholm et al. | 55/319 |
| 2007/0209340 A1 * | 9/2007 | Conrad | 55/345 |
| 2007/0240391 A1 * | 10/2007 | Becker et al. | 55/423 |
| 2009/0139192 A1 * | 6/2009 | Sams et al. | 55/418 |
| 2009/0223186 A1 * | 9/2009 | Herges et al. | 55/317 |
| 2010/0083832 A1 * | 4/2010 | Pondelick et al. | 95/261 |
| 2010/0242422 A1 * | 9/2010 | Heikamp | 55/459.1 |
| 2010/0242931 A1 * | 9/2010 | Huff | 123/574 |

FOREIGN PATENT DOCUMENTS

| | | |
|---|---|---|
| WO | WO2005018780 | 3/2005 |
| WO | WO2005026497 | 3/2005 |

* cited by examiner

FLUID SEPARATING VESSEL

PRIORITY CLAIM

The present application claims priority of Norwegian Patent Application No. 20063167 filed 7 Jul. 2006.

BACKGROUND OF THE INVENTION

The invention relates to a fluid separating vessel.

International patent application WO2005/026497 discloses a fluid separating vessel with a liquid outlet near the bottom of the vessel and a gaseous fluid outlet near the top of the vessel.

It is also known to arrange one or more cyclones near the top of a gravity type separating vessel in which at least some liquid droplets that may be entrained in the substantially gaseous fluid stream flowing in upward direction from a fluid inlet towards the gaseous fluid outlet are coalesced, separated from the gaseous carrier fluid and induced to drip down towards the liquid outlet.

A problem with the known separators with cyclones arranged near the top of the separating vessel is that the cyclones have a limited liquid removal efficiency. This requires installation of a large amount of cyclones in a so-called cyclone deck and the installation of this large amount of cyclones requires the use of a separating vessel with a large internal width.

Such a wide separating vessel is expensive and a large and heavy piece of equipment.

It is an object of the present invention to provide a separating vessel, which can have a smaller diameter and/or a higher fluid separation efficiency and/or a higher throughput for a given separation quality than a conventional separating vessel in which a cyclone deck is arranged.

SUMMARY OF THE INVENTION

In accordance with the invention there is provided a fluid separating vessel comprising:
   a liquid outlet near the bottom of the vessel;
   a gaseous fluid outlet near the top of the vessel;
   a plurality of cyclones arranged in an upper region of the vessel in which at least some liquid droplets that may be entrained in the substantially gaseous fluid stream flowing in upward direction from a fluid inlet towards the gaseous fluid outlet are coalesced, separated from the gaseous carrier fluid and induced to drip down towards the liquid outlet; and
   a plurality of rotating liquid coalescing centrifuges that are arranged below the cyclones, in which liquid coalescing centrifuges fluid fed to the cyclones is pre-treated such that at least some liquid droplets that may be entrained in the substantially gaseous fluid stream flowing in upward direction from the fluid inlet towards the cyclones are coalesced.

It is preferred that each of the liquid coalescing centrifuges comprises a rotor that is induced to rotate about a substantially vertical axis by the fluid stream flowing through the rotor, which rotor comprises fluid compartments that are separated by substantially radial separating walls.

Preferably, the rotor of each centrifuge is induced to rotate by one or more swirl imparting vanes that are arranged below a fluid inlet of the centrifuge.

The rotor of each centrifuge may have a frusto-conical shape and in upward direction a gradually increasing internal width to enhance liquid removal from the substantially gaseous carrier fluid.

These and other features, embodiments and advantages of the method according to the invention are described in the accompanying claims, abstract and the following detailed description of preferred embodiments in which reference is made to the accompanying drawings.

DETAILED DESCRIPTION OF PREFERRED EMBODIMENTS OF THE INVENTION

Figure 1:
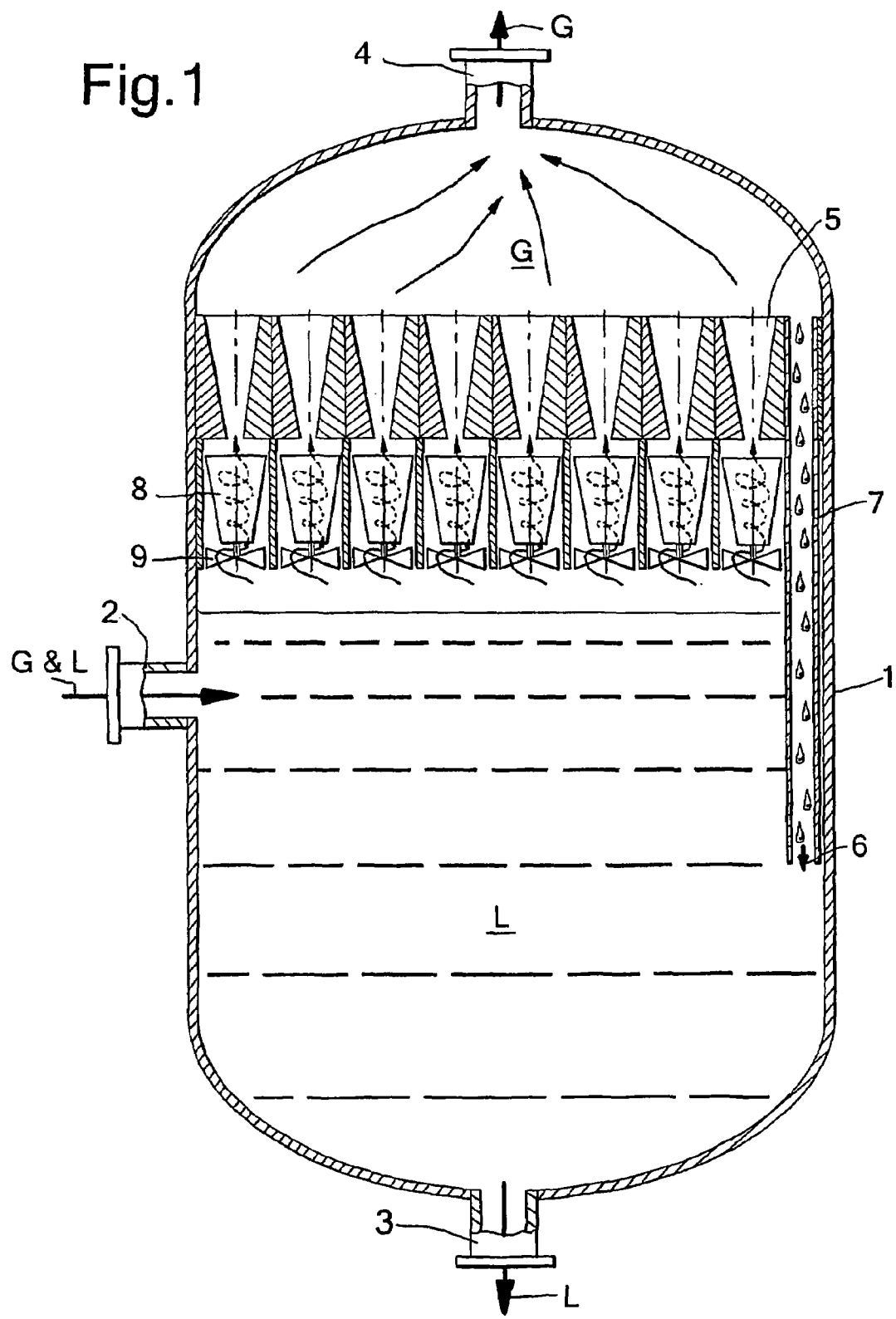
FIG. 1 depicts a separating vessel with cyclones and centrifugal coalescers according to the invention.

FIG. 1 depicts a fluid separating vessel 1 with a multiphase fluid inlet 2 arranged in a mid-section of the vessel 1, a liquid outlet 3 arranged at the bottom of the vessel and a gas outlet 4 arranged at the top of the vessel 1.

A plurality of cyclones 5 is arranged near the top of the vessel 1 in which liquid droplets in the substantially gaseous gas stream flowing up towards the gas outlet 4 are coalesced and removed and subsequently induced to drip back through a liquid return conduit 7 towards the bottom of the vessel 1 as indicated by arrow 6.

To enhance the coalescence of liquid droplets an array of coalescing centrifuges 8 is arranged upstream of the array of cyclones 5, which centrifuges 8 are located above an array of swirling vanes 9 which induce the fluid to enter the centrifuges 8 in a swirling motion such that the rotors of the centrifuges are induced to rotate by the swirling motion of the fluid passing therethrough.

Figure 2:
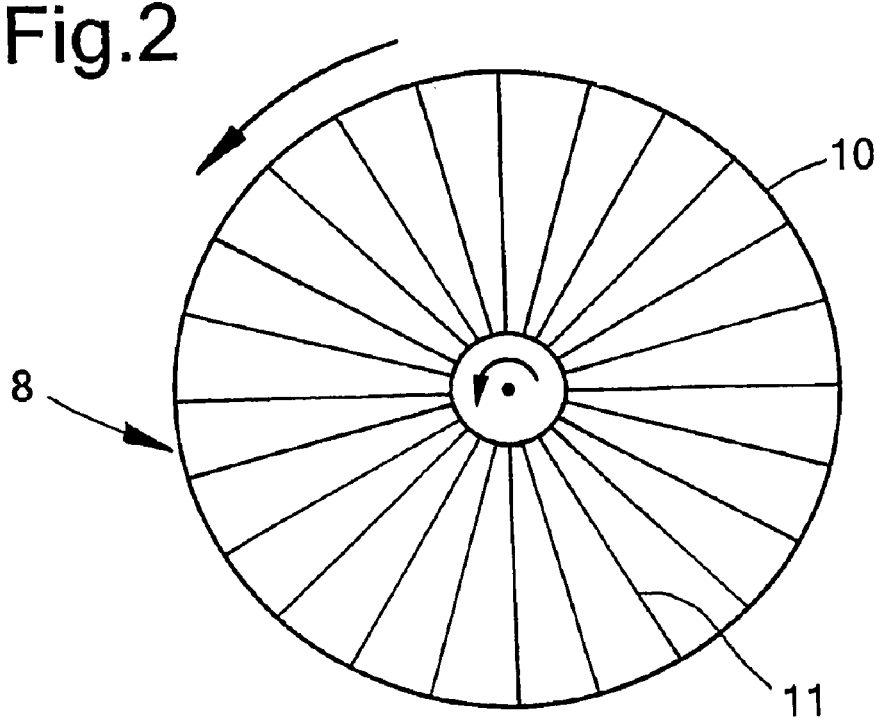
FIG. 2 depicts a cross-sectional view of the rotor of one of the centrifugal coalescers shown in FIG. 1.

FIG. 2 depicts a cross-sectional view of the rotor 10 of one of the centrifuges 8, in which a series of substantially radial separating walls 11 are arranged on which films of coalesced droplets may be deposited.

Figure 3:
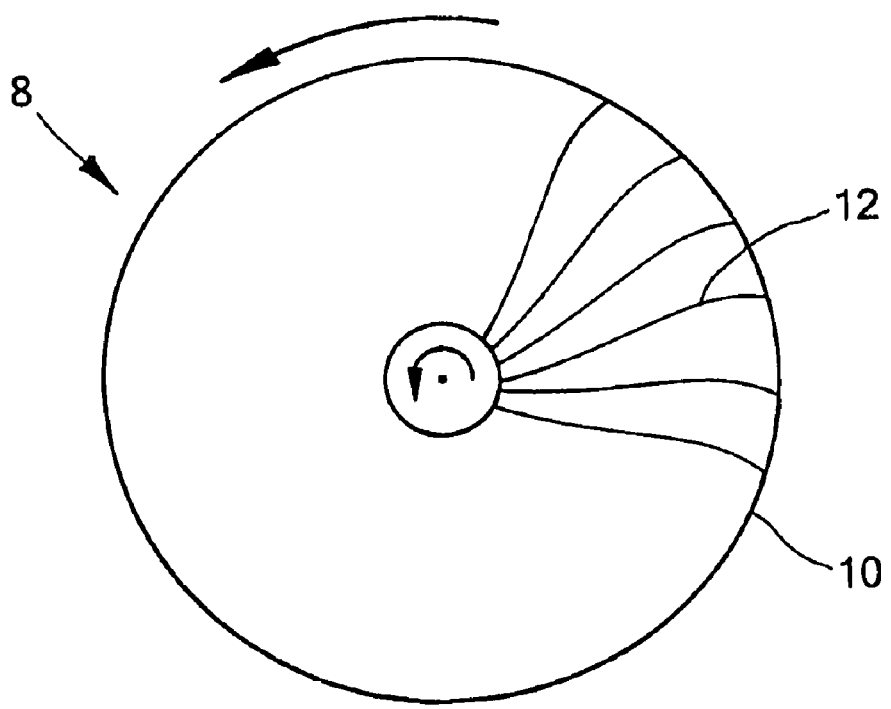
FIG. 3 depicts a cross-sectional view of an alternative embodiment of the rotor of FIG. 2

FIG. 3 depicts a cross-sectional view of an alternative embodiment of a rotor 10 of one of the centrifuges 8, wherein the separating walls 12 have a curved shape.

That which is claimed is:

1. A fluid separating vessel comprising:
   a gas and liquid inlet arranged in a mid-section of the vessel;
   a liquid outlet near the bottom of the vessel;
   a gaseous fluid outlet near the top of the vessel;
   a plurality of cyclones arranged in an upper region of the vessel in which at least some liquid droplets that may be entrained in the substantially gaseous fluid stream flowing in upward direction from the gas and liquid inlet towards the gaseous fluid outlet are coalesced, separated from the gaseous carrier fluid and induced to drip down towards the liquid outlet; and
   a plurality of rotating liquid coalescing centrifuges that are arranged below the cyclones, in which liquid coalescing centrifuges fluid fed to the cyclones is pre-treated such that at least some liquid droplets that may be entrained in the substantially gaseous fluid stream flowing in upward direction from the gas and liquid inlet towards the cyclones are coalesced.

2. The fluid separating vessel of claim 1, wherein each of the liquid coalescing centrifuges comprises a rotor that is induced to rotate about a substantially vertical axis by the fluid stream flowing through the rotor, which motor comprises fluid compartments that are separated by substantially radial separating walls.

3. The fluid separating vessel of claim 2, wherein the rotor of each centrifuge is induced to rotate by one or more swirl imparting vanes that are arranged below a fluid inlet of the centrifuge.

4. The fluid separating vessel of claim 2, wherein the rotor of each centrifuge has a frusto-conical shape and has in upward direction a gradually increasing internal width.

* * * * *